United States Patent [19]
Lang et al.

[11] 4,023,864

[45] * May 17, 1977

[54] AUTOMATIC STABILITY CONTROL SYSTEM WITH STRAIN GAUGE SENSORS

[75] Inventors: Thomas J. Lang, Torrance, Calif.; Joseph A. Lang, Huntington Station; Kenneth G. Lang, East Northport; Robert L. Davis, Lloyd Harbor, all of N.Y.

[73] Assignee: Lang Davis Industries, Inc., Huntington, N.Y.

[ * ] Notice: The portion of the term of this patent subsequent to Sept. 30, 1992, has been disclaimed.

[22] Filed: Sept. 29, 1975

[21] Appl. No.: 617,714

Related U.S. Application Data

[63] Continuation-in-part of Ser. No. 399,196, Sept. 20, 1973, Pat. No. 3,908,782, which is a continuation-in-part of Ser. No. 269,035, July 5, 1972, Pat. No. 3,895,683.

[52] U.S. Cl. .............................. 303/20; 180/103 BF; 188/3 R; 188/112; 303/7
[51] Int. Cl.² .......................................... B60T 7/20
[58] Field of Search ................. 73/398 AR, 517 R; 180/103 BF, 103 R, 104; 188/3 R, 112, 181 A; 280/446 B; 303/3, 7, 20

[56] References Cited

UNITED STATES PATENTS

| | | | |
|---|---|---|---|
| 2,400,467 | 5/1946 | Ruge | 73/398 AR X |
| 2,535,998 | 12/1950 | Bierman | 73/398 AR X |
| 2,856,036 | 10/1958 | Mullen | 180/103 BF X |
| 3,023,627 | 3/1962 | Geyling | 73/517 R |
| 3,574,414 | 4/1971 | Jacob | 188/3 R X |
| 3,790,807 | 2/1974 | Rossieno | 303/7 |
| 3,897,979 | 8/1975 | Vanealis et al. | 188/3 R X |
| 3,908,782 | 9/1975 | Lang et al. | 180/103 BF |

*Primary Examiner*—Stephen G. Kunin
*Attorney, Agent, or Firm*—Clarence A. O'Brien; Harvey B. Jacobson

[57] ABSTRACT

An automatic stability control system is provided which senses the lateral acceleration of a vehicle by way of strain gauge sensors, or the like, to provide lateral acceleration signals to an amplifier. Since strain gauge sensors which operate on the piezoelectric effect provide very weak signals, special amplifier circuits must be employed. The amplified signals control a brake assembly on the vehicle to simultaneously, continuously and gradually apply the right and left brakes with a force proportional to the lateral acceleration signals in order to eliminate swerving or swaying of the vehicle. The amplifier is mounted in the vehicle and includes a sensitivity adjustment for setting a threshold point corresponding to a minimum lateral acceleration force to which the system will respond. Sensor configurations are also used which have strain gauges to sense the regular brake fluid pressure of the vehicle in combination with the lateral force sensing sensors. Additional sensitivity adjustments are provided for the amplifiers of these configurations. The control system is primarily adapted for use in a trailing or towed vehicle in combination with a leading or towing vehicle although it is equally effective when used in a single vehicle.

21 Claims, 9 Drawing Figures

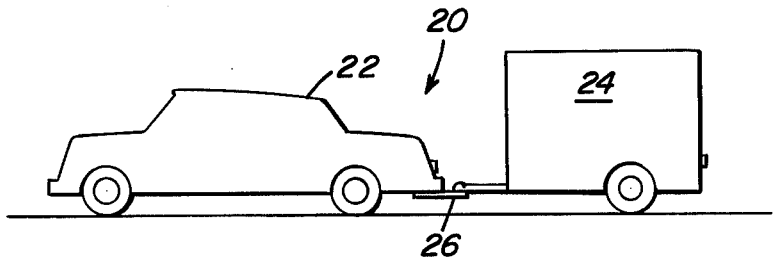
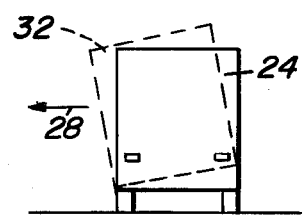
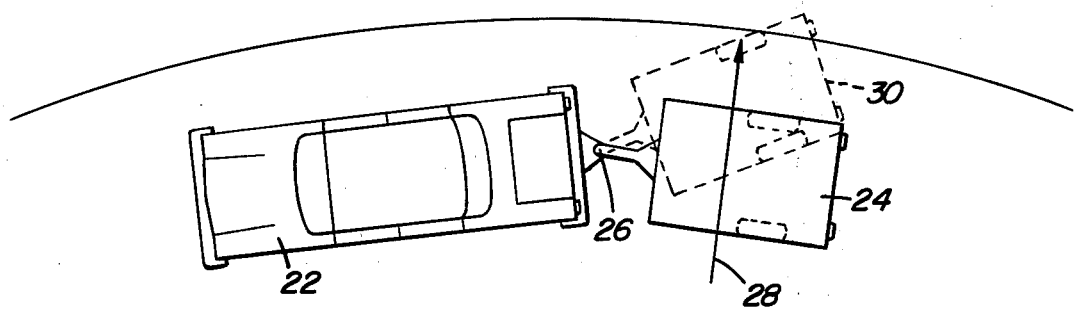
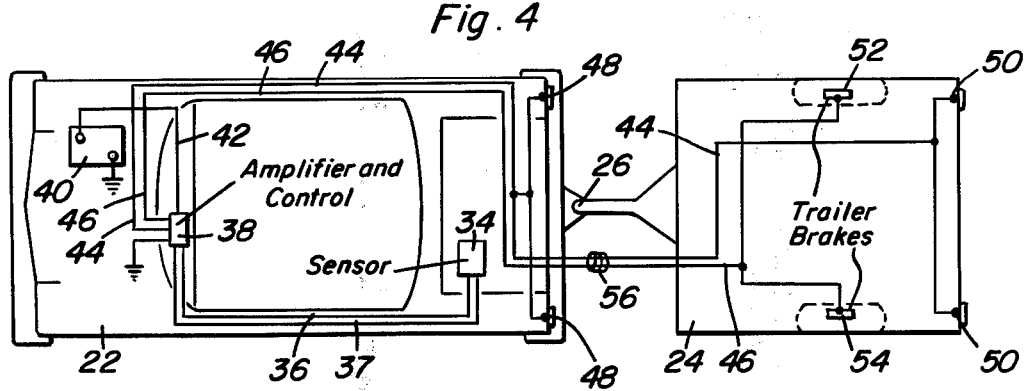
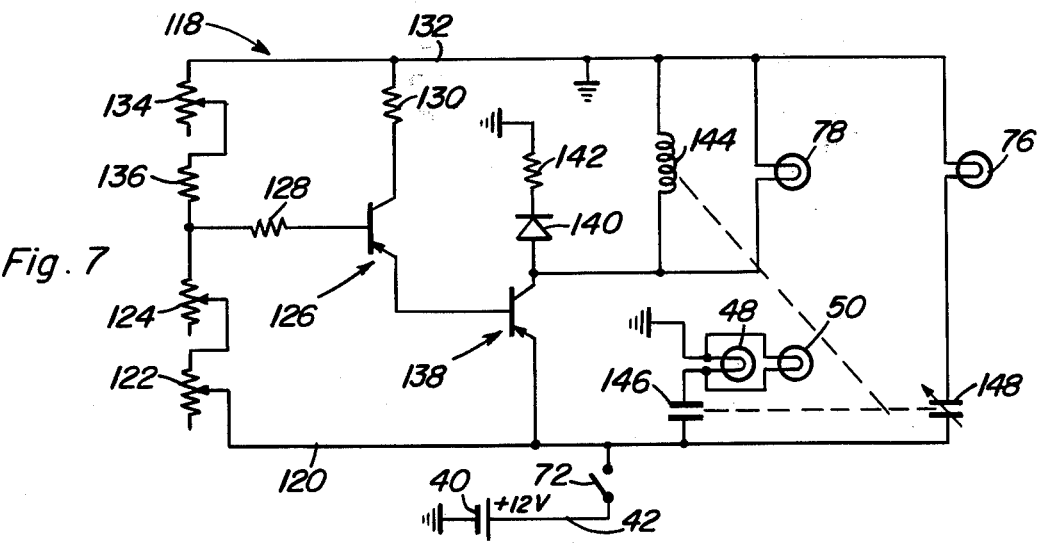

AUTOMATIC STABILITY CONTROL SYSTEM WITH STRAIN GAUGE SENSORS

CROSS REFERENCE TO RELATED APPLICATION

This application is a continuation-in-part of our co-pending application Ser. No. 399,196, filed Sept. 20, 1973 now Pat. No. 3,908,782, for Automatic Stability Control System, which in turn is a continuation-in-part of application Ser. No. 269,035 filed July 5, 1972, now U.S. Pat. No. 3,895, 683.

BACKGROUND OF THE INVENTION

The present invention is generally related to trailer brake systems and, more particularly, to an automatic stability control system for trailers and other towed vehicles to eliminate swaying and swerving behind a towing vehicle.

In the past, various trailer brake systems have been proposed to prevent undesirable movements of a trailer behind its towing vehicle. Many conventional systems have included manually operated controls for effecting braking of the trailer, while others have been provided with semi-automatic controls connected to the towing vehicle's brake system to simultaneously apply the brakes of both the towing vehicle and trailer. It is apparent that such conventional systems either require the personal attention of the vehicle driver or do not provide independent braking of the towing vehicle and trailer.

It is an object of the present invention to provide a novel automatic stability control system together with strain gauge sensors for trailers and the like which overcomes the above-mentioned shortcomings of conventional systems.

Another object of the present invention is to provide a unique automatic stability control system including means for simultaneously applying brakes on both sides of a towed vehicle in response to predetermined lateral acceleration conditions as detected by solid-state sensors whereby swerving or swaying of the towed vehicle behind its towing vehicle is automatically prevented or significantly attenuated, regardless of the trailer load or system response time.

It is a further object of the present invention to provide a versatile stability control system including means for amplifying low level lateral acceleration signals furnished by compact solid-state strain gauge sensors, whereby the amplifier provides relatively high braking currents to the associated trailer braking system.

Still another object of the present invention is to provide an automatic stability control system including a signal amplifier adapted to be mounted in the towing vehicle and provided with adjustments for conveniently setting the sensitivity of the system even while the vehicle is in motion, thereby making it possible to obtain the best setting for the particular road conditions and trailer load.

It is still a further object of the present invention to provide a novel lateral acceleration force transducer including a mass element having strain gauge sensors thereon operatively connected to circuit elements, the mass element being movable in opposite directions in response to corresponding lateral forces.

Yet another object of the present invention is to provide an automatic stability control system including lateral acceleration strain gauge sensors in combination with a brake pedal responsive hydraulic pressure strain gauge sensor which together provide braking of the trailer under a wide variety of conditions. The amplifier for this system also has sensitivity adjustments for each of these separate sensors.

SUMMARY OF THE INVENTION

In carrying out the above objects of the present invention, the stability control system is provided with an amplifier, preferably mounted in the towing vehicle, with adjustments for setting the sensitivity of the system. Solid state strain gauge transducers are provided with adjustable resistors, for example, associated with the amplifier input. The effective value of the input to the amplifier circuit is varied in proportion to the magnitude of the sensed lateral acceleration forces to provide control signals to the trailer brakes. This arrangement provides accurately controlled braking, as the applied brake forces are gradual and continuously applied after actuation and are proportional to the sensed lateral acceleration forces. Preferably, the sensitivity adjustment is provided in the form of a selectively adjustable resistor, such as a potentiometer, associated with the amplifier to determine the threshold point at which amplification begins. Under some conditions, the system may be set to be insensitive to mild lateral acceleration forces, and under other conditions to respond to such mild forces.

In another form of the invention, a manually adjustable control and brake pedal responsive sensor are also associated with the amplifer input to further control the braking action. With this arrangement, the system is capable of responding to the lateral acceleration forces, as well as to application of the towing vehicle brakes. Application of the towing vehicle brakes automatically actuates the trailer brakes, regardless of the absence of lateral acceleration forces acting upon the trailer and vice versa.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of a typical towing vehicle and trailer assembly utilizing the stability control system of the present invention.

FIG. 2 is a top plan view of the towing vehicle and trailer rounding a curve with a dash line view of the trailer in a lateral skid.

FIG. 3 is a front end view of the trailer shown in FIG. 2 with a dash line view of the trailer in a tilted position due to lateral acceleration forces.

FIG. 4 is a diagrammatic illustration of the automatic stability control system as used with the present invention.

FIG. 7 is a schematic diagram of the circuitry associated with the system of the co-pending application Ser. No. 399,196 now U.S. Pat. No. 3,908,782

DETAILED DESCRIPTION OF THE INVENTION

Figure 5:
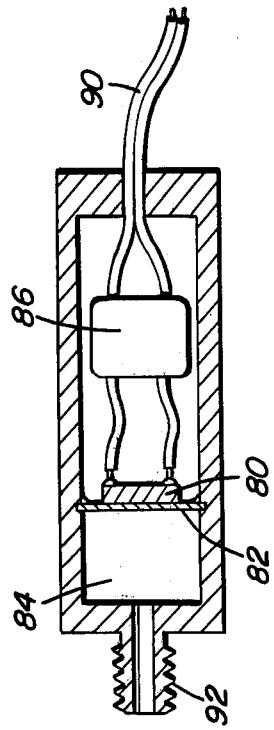
FIG. 5 is a cross-sectional view of a strain gauge hydraulic pressure sensor as used with the automatic stability control system of the present invention.

Referring now, more particularly, to FIGS. 1–3, a typical towing vehicle and trailer combination utilizing the system of the present invention is generally indicated by the numeral 20 and includes an automobile, or other towing vehicle 22 operatively connected to a trailer 24, by way of a trailer hitch 26. The trailer hitch is of a conventional type which permits pivotal movement of the trailer relative to the towing vehicle. While such pivotal connection is necessary between the towing vehicle and the trailer to permit cornering and other maneuvers, the trailer is susceptible to swerving or fishtailing relative to the towing vehicle under adverse conditions. Most often, these conditions occur when the towing vehicle is proceeding around a curve, as illustrated in FIG. 2. When negotiating a curve, both the towing vehicle and trailer experience lateral acceleration forces acting in a radially outward direction as indicated by arrow 28 in FIGS. 2 and 3. When the lateral acceleration forces acting upon the trailer exceed the frictional forces of the tires engaged with the road, the trailer tends to break away and swing outwardly to a position such as that indicated in dash lines 30 in FIG. 2. This movement can cause the trailer to jackknife or fishtail behind the vehicle, causing loss of control over the trailer. This skidding or breakaway condition of the trailer is normally accompanied by tilting of the trailer as the trailer rounds the curve, such as that indicated in dash lines 32 in FIG. 3.

The stability control system of the present invention senses the lateral acceleration forces acting upon the trailer to apply the trailer brakes to reduce its speed sufficiently to prevent a skid condition. It will be appreciated that the lateral accleration forces which are sensed by the control system of the co-pending application and of the present invention may take several forms other than forces imparted to the trailer when negotiating a curve. For example, a sudden gust of wind or change in road surface contour which impart lateral forces to the trailer will also be sensed by the system to provide necessary braking of the trailer to prevent loss of control.

Referring now to FIG. 4 of the drawings, it will be observed that the automatic stability control system of the invention is provided with a sensor or transducer 34, preferably mounted in the trunk or rear portion of the towing vehicle 22. The sensor is responsive to predetermined lateral acceleration forces acting thereon, as hereinafter explained, and is electrically connected by lines 36 and 37 to an amplifier and control unit 38, preferably mounted to the vehicle dashboard. Unit 38 is appropriately connected to the vehicle storage battery 40 or other source of electrical energy by way of line 42. Towing vehicle brake lights 48 and trailer brake lights 50 are appropriately connected to amplifier unit 38 by way of line 44. The trailer is provided with right and left electrical brakes 52 and 54 which are appropriately connected to the amplifier unit by way of line 46. Preferably, a conventional type connector 56 is provided for convenient disconnection of the lines between the towing vehicle and trailer. Electrical brakes 52 and 54 are of a type which provide braking forces which are proportional to the electric current applied. Amplifier unit 38 controls the magnitude of current fed to the brakes and, as such, controls the magnitude of the braking forces which are applied.

Preferably, sensor 34 is mounted in the towing vehicle trunk or other appropriate location near the rear of the towing vehicle. This mounting arrangement has been found to be most desirable as it substantially eliminates erroneous responses of the system due to bouncing, vibrations, and other movements normally associated with trailers and other towed vehicles but not indicative of adverse handling conditions. The towing vehicle being of greater mass and being at least a two axle vehicle is more stable than the trailer and, as such, is not significantly affected by such movements.

FIG. 5 shows a strain gauge hydraulic pressure sensor. The strain gauge 80 undergoes a piezoelectric resistance change as the thin metal diaphragm 82 is deflected by the pressure of the brake fluid on the other side 84. The resulting electrical signal is carried to an electronics package 86 which may contain temperature compensating elements or Wheatstone Bridge completion resistors. The refined signal is then brought from the device in output wiring 90. In our usage the device is attached (via a T fitting) into the rear hydraulic brake line of the automobile by screw attachment 92.

Figure 6:
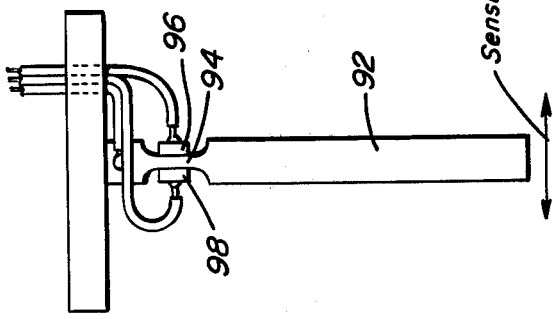
FIG. 6 is a perspective view of a strain gauge lateral acceleration sensor associated with the present invention.

FIG. 6 shows a strain gauge sensor adapted to measure lateral acceleration. Forces on the suspended mass 92 (of metal) are transmitted to a flexible steel neck portion 94 resulting in minute bending of the neck. The strain gauges 96, 98 are mounted to the neck so as to pick up any deflection of the neck in the direction of the sensing axis. For our application, the sensing axis would point in the same direction as the rear axle of the vehicle so as to measure lateral forces on the vehicle. In our usage, the device of FIG. 5 is supported within a protective casing and mounted in the vehicle exactly as the pendulm potentiometer unit of the co-pending application has been.

With reference to FIG. 7, the schematic diagram of a form of amplifier circuit associated with the invention if the co-pending application is illustrated. The amplifier is connected to a typical towing vehicle battery 40 by way of line 42 and on-off switch 72. With on-off switch closed, a +12V, or other appropriate voltage, is supplied to line 120. A pair of adjustable potentiometer resistors 122 and 124, associated with the pendulum potentiometers as described in the co-pending application are serially connected to line 120. The amplifier is provided with a first power transistor 126 with a collector resistor 130, connected to ground by line 132. An adjustable sensitivity resistor 134 is connected between ground line 132 and a fixed bias resistor 136. Base resistor 128 is connected to a point between bias resistor 136 and adjustable resistor 124.

A second power transistor 138 is base connected to the emitter of transistor 126. The emitter of transistor 138 is connected to line 120 and its collector is connected to electrical brake circuit 142 through diode 140. It will be appreciated that when transistor 138 is conductive, current flows to electric brake circuit 142 to apply the trailer brakes in a manner explained before. Normally both transistors 126 and 138 are nonconductive.

When predetermined lateral acceleration forces are sensed by either pendulum of the transducer, the value of resistor 122 or resistor 124 in the amplifier circuit is increased. When either of these reistances is increased to a predetermined value, the base of transistor 126 is driven sufficiently negative to drive it into conduction. This, in turn, renders transistor 138 conductive and the trailer brakes are applied. The greater the composite value of resistance introduced into the input circuit by resistors 122 and 124, the greater will be the current flow through the power transistors and the larger will be the braking forces.

It will be appreciated that the potential of the base of transistor 126 is determined in part by the combined resistance of serially connected resistors 134 and 136. By adjusting the value of resistor 134, the point at which transistor 126 conducts may be selected. In effect, this provides an electrical threshold setting which determines how far the pendulums must be displaced in order to render the transistors conductive to apply the trailer brakes. The sensitivity may be set at the most desirable position corresponding to the particular trailer load, road conditions, and the like. It is important to note that this setting may be conveniently made by the vehicle operator while the vehicle is in motion. This permits the driver to test the system to provide the most desirable setting. Furthermore, if road conditions should change, the driver can make the appropriate adjustments without stopping the vehicle. It will also be appreciated that the current conducted by transistor 138 is directly proportional to the change in resistance of the pendulum sensors above the electrical threshold point. This is an important feature as it provides braking forces which are proportional to the lateral acceleration forces above the threshold setting. Thus, mild lateral acceleration forces will provide light braking forces and larger lateral acceleration forces will provide relatively heavier braking forces. Such an arrangement provides a high degree of stability to the trailer regardless of the lateral acceleration forces. It is also emphasized that such control is provided automatically without the attention of the driver once the sensitivity setting has been made.

Referring again to FIG. 7, it will be observed that the amplifier control unit is provided with a relay coil 144 connected between the collector of power transistor 138 and ground line 132. Indicating light 78 is also connected in parallel with coil 144. When transistor 138 conducts under adverse lateral acceleration conditions, relay coil 144 and indicating light 78 are energized. Energization of indicating light 78 informs the driver of the adverse conditions and that the trailer brakes have been automatically applied. Relay coil 144 is operatively connected to normally opened contact 146 and normally closed contact 148. Indicating lamp 76 associated with the amplifier unit is serially connected to normally closed contact 148. Brake lights 48 and 50 associated with a towing vehicle and trailer are connected to normally opened contact 146. When relay coil 144 is energized, the brake lights are energized, while indicating light 76 is de-energized. Thus, the amplifier control unit associated with the invention not only provides automatic control operation of the trailer brakes, but also indicates such a condition to the vehicle operator and effects energization of the vehicle and trailer brake lights.

Figure 8:
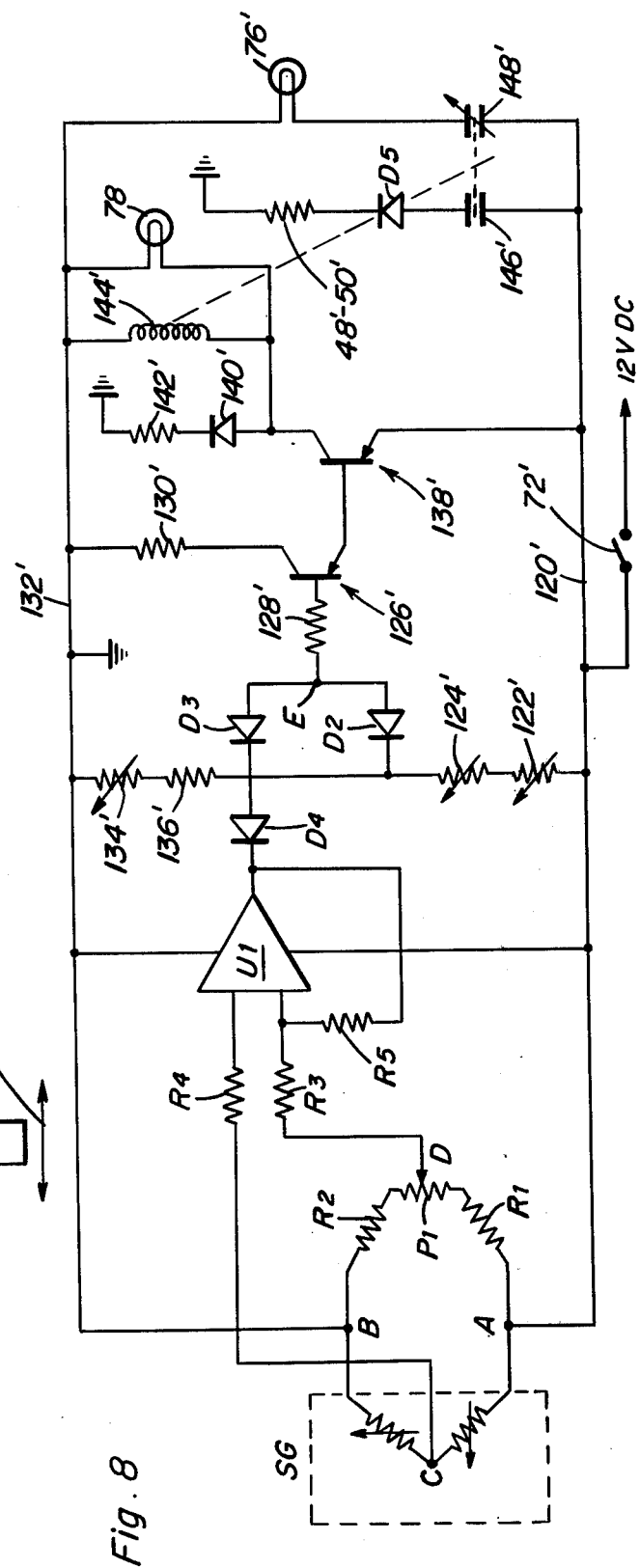
FIG. 8 is a schematic diagram of the circuitry associated with the improved form of the system of the present invention.

FIG. 8 shows the circuitry which must be added to the amplifier of FIG. 7 to accept an input from a strain gauge type hydraulic pressure sensor as shown in FIG. 5. The circuitry of FIG. 8 is capable of applying trailer braking proportional to lateral acceleration (via sensed resistance change in potentiometers 122 or 124 as described above) or proportional to tow vehicle brake pedal commands (via sensed reistance change in strain gauge hydraulic pressure sensor SG). Operation by either means is independent of the other. If both sensing means are actuated, then due to the diode connection, D2 and D3, the amplifier will supply braking current proportional to the greater of the two commands.

The basic purpose for the additional circuitry of FIG. 8 is to take the differential low level (approximately 0.01 to 0.3 volts) voltage output of the strain gauge sensor, SG, and amplify it to the point where it can be used to trigger the following amplifier stages which control the trailer brakes.

The strain guage sensor, SG, is a solid state device as in FIG. 5 in which the elements of a resistive voltage divider network commonly called the "Wheatstone Bridge" are varied in response to a stress or strain input by the piezoelectric effect to yield a differential voltage output. This strain gauge may contain internally either all or half of the elements of the Wheatstone Bridge. FIG. 8 shows a half-bridge strain gauge, with the Wheatstone Bridge completed external to the strain gauge sensor, SG, using resistive circuit elements R1, R2 and P1. P1 is a trimming potentiometer which allows exact balancing of the Wheatstone Bridge so that no output voltage is present when no stress is sensed. A full-bridge strain gauge containing not only the strain sensing elements shown in SG, but also the elements R1, R2, and P1 may be used. In our application, the potentiometer P1 is used as a sensitivity control, and is mounted on or close to the dash, enabling the driver to select the amount of braking response which will be applied for a particular amount of brake pedal application.

In either case, the use of the strain guage/Wheatstone Bridge circuit is the same. An input voltage of 12 vdc is supplied to the bridge at node A and node B is connected to ground. A differential output voltage which is proportional to the property being sensed (hydraulic brake fulid pressure) is then received at nodes C and D. That is, the voltages of points C and D are exactly the same if no hydraulic pressure is sensed and as the sensed hydraulic pressure increases the elements within SG are varied by stress such that an increasing voltage differential between nodes C and D is produced. The remainder of the added circuitry of FIG. 8 is used to turn this small voltage differential into the type of signal necessary to activate the amplifier circuitry of FIG. 7. This is accomplished so that the current through the brake is proportional to either the brake hydraulic fluid pressure (sensed by strain gauge sensor) or vehicle lateral acceleration which is sensed by the pendulum/-potentiometer sensor.

The differential voltage signal from nodes C and D is sent through impedance matching resistors, R3 and R4, to the input terminals of an operational amplifier, U1. The operational amplifier is also supplied with 12 vdc power and ground return at the appropriate terminals. The output of the operational amplifier is sent through voltage dropping diodes, D3 and D4, to the input of the amplifier of FIG. 7. A gain control is provided for operational amplifier by way of feedback control resistor R5 which may be adjustable. Potentiometer P1 enables the driver to select the amount of braking response which will be applied for a particular amount of automobile brake pedal application (brake fluid hydraulic pressure). Thus for various trailering loads or various driving conditions the braking response can easily be adjusted to the correct sensitivity. The output voltage of the operational amplifier is such that the voltage at circuit node E in FIG. 8 is decreased proportionally as the strain gauge sensor is activated. This causes proportional current to be applied through the brakes. Notice that the diodes, D2 and D3 are connected such that the voltage at node point E is equal to the lower of the voltages to the left of diodes D2 or D3. Therefore, the current to the brake will be the greater of the currents called for by either the strain guage sensor, SG, or the pendulum/potentiometer sensors controlling 122' and 124'. In this way the strain gauge and potentiometric sensors are completely independent in operation, yet work together to provide a safe trailer braking circuit.

Figure 9:
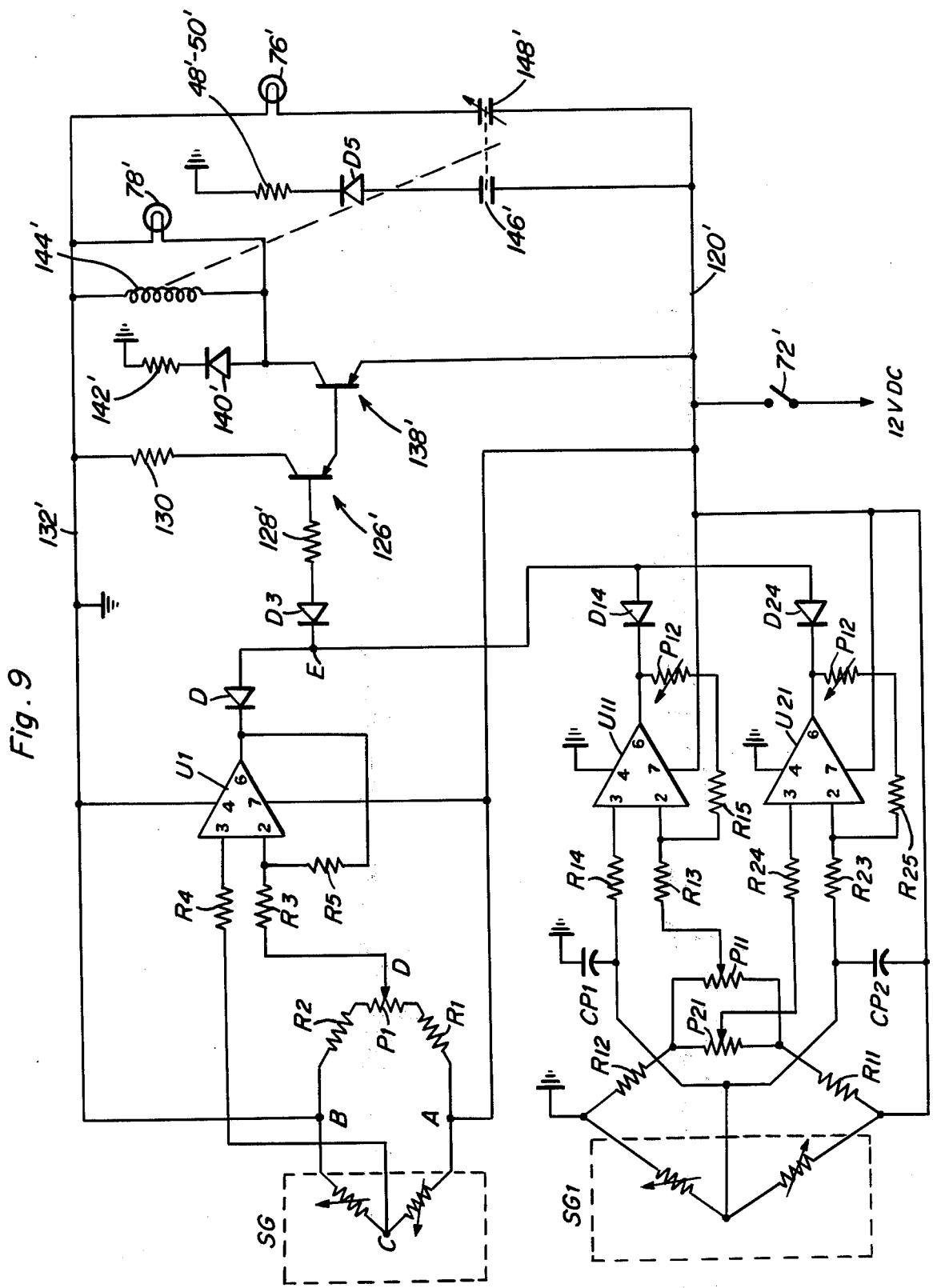
FIG. 9 is a schematic diagram similar to FIG. 8 illustrating a modified arrangement in which the brake pedal sensor and lateral sensor are both of the strain gauge type and are connected to provide separate sensitivity controls for the lateral acceleration and brake pedal sensors.

Another form of this invention utilizes a strain gauge sensor as shown in FIG. 6 to sense vehicle lateral acceleration rather than the pendulum/potentiometer sensor as above. FIG. 9 is a schematic of the circuitry employed to accept signals from such a strain gauge type lateral acceleration sensor (SG1) shown in the lower left portion of the schematic. The circuitry of FIG. 9 then applies the trailer brakes proportionately to commands received from the strain gauge hydraulic pressure sensor (SG) or the strain gauge lateral acceleration sensor (SGI). Once again by virtue of diodes D4, D14 and D24, the largest command is the one which is responded to. If one has understood the circuit for the strain gauge hydraulic pressure sensor which has been described for FIG. 8, then the circuit additions for the strain gauge lateral acceleration sensor (of FIG. 9) are easily understood. Whereas the pressure sensor must respond in only a single direction (i.e., sense hydraulic pressure increases), the lateral acceleration sensor must respond in two directions (i.e., sense acceleration in the "right" and "left" directions). For this reason, two preamplifier stages, like the one added in FIG. 8 for the pressure sensor, have been added in FIG. 9 for the lateral acceleration sensor. One responds to positive voltage differences of the Wheatstone Bridge ("right" accelerations) and one responds to negative voltage differences of the Wheatstone Bridge ("left" accelerations). The operation of each channel is as described above for the hydraulic pressure sensor. The only difference is that trimpots P11 and P21 are set at the time of manufacture and the driver controls the sensitivity of the lateral acceleration circuitry (i.e., determines the amount of trailer braking for a given amount of lateral acceleration) by adjusting the gain of the two pre-amplifiers by means of ganged potentiometers P12 and P22. ("Ganged" means that both potentiometers operate on a single shaft). This structure would also be mounted within easy reach of the driver.

Another important difference is that capacitors CP1 and CP2 have been added to eliminate undesirable voltage transients on the output of the Wheatstone Bridge due to coupling between the vibration of the vehicle and the natural frequency of the strain gauge lateral acceleration sensor. Otherwise the operation of the pre-amplifiers for the acceleration sensor is as described above for the pressure sensor.

The available combinations of sensors as contemplated by this invention are:

A. Pendulum/potentiometer sensor for vehicle lateral acceleration and strain gauge sensor for brake fluid hydraulic pressure.
B. Two strain gauge sensors; one for vehicle lateral acceleration and one for brake fluid hydraulic pressure.
C. A lateral acceleration sensor only; of either the potntiometer or strain gauge type.
D. A strain gauge brake fluid hydraulic pressure sensor only.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. An automatic stability control system for a vehicle to prevent swerving and swaying of said vehicle, said system comprising: means for sensing lateral acceleration forces acting upon said vehicle to provide low level electrical acceleration signals proportional to the magnitude of said forces, means for amplifying said low level acceleration signals to provide large amplitude brake control signals proportional to the magnitude of the forces, and brake means associated with said vehicle including right and left brakes and responsive to said brake control signals to simultaneously actuate said right and left brakes in an equal gradual and continuous mode to prevent swaying and swerving of said vehicle, said sensing means including a force responsive mass oriented to sense lateral acceleration and provide by strain gauge sensor means instantaneous response upon sensing lateral acceleration.

2. The automatic stability control system as defined in claim 1 wherein said suspended mass includes a support member for said mass oriented to sense only left and right acceleration, said member including strain gauge means thereon to provide low level electrical lateral acceleration signals proportional to the magnitude of movement of the mass.

3. The automatic stability control system as defined in claim 2 together with additional means response to actuation of the primary hydraulic brake system to effect actuation of said brake means under predetermined conditions independent of said lateral acceleration forces.

4. The device of claim 3 wherein the additional means includes a hydraulic pressure strain gauge sensor.

5. The device of claim 3 wherein separate amplifier means are provided for said lateral sensor means and for said additional means.

6. The device of claim 5 wherein each amplifier means includes sensitivity adjustment means for setting the minimum magnitude of signals to which each said amplifier means responds to provide said brake control signals.

7. The system set forth in claim 6 wherein said sensitivity adjustment means defines an electrical threshold setting for said amplifier means.

8. The system set forth in claim 7 wherein said sensitivity adjustment means includes adjustable resistance means associated with each said amplifier means.

9. The system set forth in claim 6 wherein said sensitivity adjustment means is located in said vehicle for convenient operation by the driver.

10. The system set forth in claim 1 together with auxiliary control means connected to said amplifier means for operating said electric brake means under predetermined conditions independent of said lateral acceleration forces.

11. The system set forth in claim 10 wherein said auxiliary control means includes a hydraulic pressure strain gauge responsive to operation of the vehicle hydraulic brake system.

12. The system set forth in claim 11 wherein said auxiliary control means further includes manually adjustable resistance means.

13. The system set forth in claim 11 wherein said auxiliary control means includes brake responsive resistance means responsive to operation of the vehicle brake system and manually adjustable resistance means.

14. The system as defined in claim 13 wherein said force responsive mass includes a support member for said mass oriented to sense only left and right acceleration, said member including strain gauge means thereon to provide low level electrical lateral acceleration signals proportional to the magnitude of movement of the mass.

15. An automatic stability control system for a vehicle to prevent swerving and swaying of said vehicle, said system comprising: means for sensing lateral acceleration forces acting upon said vehicle to provide low level electrical acceleration signals proportional to the magnitude of said forces, means for amplifying said low level acceleration signals to provide large amplitude brake control signals proportional to the magnitude of the forces, and brake means associated with said vehicle including right and left brakes and responsive to said brake control signals to simultaneously actuate said right and left brakes in an equal gradual and continuous mode to prevent swaying and swerving of said vehicle and additional means responsive to actuation of the primary hydraulic brake system to effect actuation of said brake means under predetermined conditions independent of said lateral acceleration forces.

16. The device of claim 15 wherein the additional means includes a hydraulic pressure strain gauge sensor.

17. The device of claim 16 wherein separate amplifier means are provided for said lateral sensor means and for said additional means.

18. The device of claim 17 wherein each amplifier means includes sensitivity adjustment means for setting the minimum magnitude of signals to which each said amplifier means responds to provide said brake control signals.

19. The system set forth in claim 18 wherein said sensitivity adjustment means defines an electrical threshold setting for said amplifier means.

20. The system set forth in claim 19 wherein said sensitivity adjustment means includes adjustable resistance means associated with each said amplifier means.

21. The system set forth in claim 18 wherein said sensitivity adjustment means is located in said vehicle for convenient operation by the driver.

* * * * *